(12) United States Patent
Chen et al.

(10) Patent No.: US 9,219,642 B2
(45) Date of Patent: Dec. 22, 2015

(54) METHOD, APPARATUS AND SYSTEM FOR PROCESSING DEVICE FAULTS

(71) Applicant: Huawei Technologies Co., Ltd., Shenzhen, Guangdong (CN)

(72) Inventors: Zhongping Chen, Shenzhen (CN); Wenfu Wu, Shanghai (CN)

(73) Assignee: Huawei Technologies Co., Ltd., Shenzhen (CN)

(\*) Notice: Subject to any disclaimer, the term of this patent is extended or adjusted under 35 U.S.C. 154(b) by 50 days.

(21) Appl. No.: 14/304,522

(22) Filed: Jun. 13, 2014

(65) Prior Publication Data

US 2014/0293769 A1  Oct. 2, 2014

Related U.S. Application Data

(63) Continuation of application No. PCT/CN2011/084270, filed on Dec. 20, 2011.

(51) Int. Cl.
*H04W 76/00* (2009.01)
*H04L 12/24* (2006.01)
(Continued)

(52) U.S. Cl.
CPC ........ *H04L 41/0672* (2013.01); *H04L 41/0654* (2013.01); *H04W 24/04* (2013.01); *H04W 76/027* (2013.01); *H04W 76/064* (2013.01); *H04W 76/021* (2013.01)

(58) Field of Classification Search
CPC .................................................. H04W 76/028
See application file for complete search history.

(56) References Cited

U.S. PATENT DOCUMENTS

| 2008/0037436 A1 | 2/2008 | Liu |
| 2008/0192626 A1 | 8/2008 | Yang |
| 2013/0114404 A1\* | 5/2013 | Yang ..................... H04W 24/04 370/228 |

FOREIGN PATENT DOCUMENTS

| CN | 1838620 A | 9/2006 |
| CN | 101001170 A | 7/2007 |

(Continued)

OTHER PUBLICATIONS

"3$^{rd}$ Generation Partnership Project; Technical Specification Group Core Network and Terminals; Study of EPC Nodes Restoration; (Release 11)," 3GPP TR 23.857, V1.6.0, pp. 1-58, 3$^{rd}$ Generation Partnership Project, Valbonne, France (Nov. 2011).

(Continued)

*Primary Examiner* — Huy D Vu
*Assistant Examiner* — Bao G Nguyen
(74) *Attorney, Agent, or Firm* — Leydig, Voit & Mayer, Ltd.

(57) ABSTRACT

The present invention relates to the communication field and discloses a method, an apparatus, and a system for processing device faults, which are used to recover the device fault in a timely manner and improve user's service experience. The processing method includes: receiving a connection deletion request message sent by a network device in the case of a fault, where the connection deletion request message includes a global packet data network connection identifier FQ-CSID; locally deleting a packet data network PDN connection related to the FQ-CSID, or retaining a PDN connection related to the FQ-CSID and receiving downlink data corresponding to the PDN connection; and performing a network-triggered service recovery procedure. The solutions provided in the present invention are applicable to device fault recovery scenarios.

20 Claims, 10 Drawing Sheets

(51) Int. Cl.
*H04W 76/06* (2009.01)
*H04W 24/04* (2009.01)
*H04W 76/02* (2009.01)

(56) References Cited

FOREIGN PATENT DOCUMENTS

| | | |
|---|---|---|
| CN | 101795232 A | 8/2010 |
| WO | WO 2007079659 A1 | 7/2007 |
| WO | WO 2011141154 A1 | 11/2011 |

OTHER PUBLICATIONS

"3$^{rd}$ Generation Partnership Project; Technical Specification Group Core Network and Terminals; Restoration procedures (Release 11)," 3GPP TS 23.007, V11.0.0, pp. 1-56, 3$^{rd}$ Generation Partnership Project, Valbonne, France (Dec. 2011).

* cited by examiner

METHOD, APPARATUS AND SYSTEM FOR PROCESSING DEVICE FAULTS

CROSS REFERENCE

This application is a continuation of International Patent Application No. PCT/CN2011/084270, filed on Dec. 20, 2011, which is hereby incorporated by reference in its entirety.

TECHNICAL FIELD

The present invention relates to the communication field, and in particular, to a method, an apparatus, and a system for processing device faults.

BACKGROUND

The core network of an evolved packet network includes mainly such three logical function entities as an MME (mobility management entity), an S-GW (serving gateway), and a P-GW (packet data network gateway). The MME is responsible for NAS (non-access stratum) signaling, NAS signaling encryption, roaming and tracking functions, allocation of temporary user identities, and security function. The MME corresponds to a control plane part of an SGSN (serving GPRS support node) inside a UMTS (universal mobile telecommunications system). The S-GW is responsible for local mobility anchor points, mobility anchor points in the 3GPP (the 3rd Generation Partnership Project) system, and lawful interception of related information. The P-GW is responsible for policy execution, charging, and lawful interception of related functions.

A PDN (packet data network) connection is a collection of one or multiple bearers with the same access point name. The first bearer created in the PDN connection establishment process is called a default bearer. If the default bearer is deleted, the PDN connection is deemed to be deleted.

A CSID (Connection Set Identifier) identifies a set of PDN connections inside one node. A set of PDN connections or PDP connections may belong to different user equipments.

An FQ-CSID (Fully Qualified Connection Set Identifier) globally identifies a CSID and is the combination of a CSID and the identifier of a node assigning the CSID. The same CSID may be assigned to different nodes. The FQ-CSID identifies the same CSID assigned to different nodes.

When a network device (MME or SGSN) encounters a fault, the network device sends the FQ-CSID of the faulty network device to an S-GW by using a connection deletion request message. The S-GW forwards the received connection deletion request message to a P-GW, where the message includes the FQ-CSID of the network device. After receiving the connection deletion request message, the P-GW retrieves PDN connection context based on the received FQ-CSID of the network device, confirms and deletes the affected PDN connection from the local, and then returns a connection deletion response message to the S-GW. The S-GW retrieves PDN connection context based on the received FQ-CSID of the network device, confirms and deletes the affected PDN connection from the local, and after receiving the connection deletion response message from the P-GW, returns the connection deletion response message to the network device.

During the implementation of device fault processing, the inventor finds that the prior art has at least the following problems: The network device, S-GW, and P-GW locally delete PDN connections corresponding to the FQ-CSID of the network device synchronously, but a user does not know that the PDN connections have been deleted. Within the period from deletion of the PDN connection to the user's active communication with the network, all services of the user equipment related to the deleted PDN connection are unreachable, which severely affects user's service experience.

SUMMARY

Embodiments of the present invention provide a method, an apparatus, and a system for processing device faults, which are used to recover a PDN connection related to a device fault and improve user's service experience.

In order to achieve the foregoing objective, the embodiments of the present invention adopt the following technical solutions.

A method for processing device faults includes: receiving a connection deletion request message sent by a network device in the case of a fault, where the connection deletion request message includes a global packet data network connection identifier FQ-CSID; locally deleting a packet data network PDN connection related to the FQ-CSID, or retaining a PDN connection related to the FQ-CSID and receiving downlink data corresponding to the PDN connection; and performing a network-triggered service recovery procedure.

A serving gateway (S-GW) includes: a first receiving unit, configured to receive a connection deletion request message sent by a network device in the case of a fault, where the connection deletion request message includes global packet data network connection identifier information FQ-CSID; a connection processing unit, configured to locally delete a packet data network PDN connection related to the FQ-CSID, or retain a PDN connection related to the FQ-CSID and receive downlink data corresponding to the PDN connection; and a service recovering unit, configured to perform a network-triggered service recovery procedure.

A network device includes a sending unit and at least one of a first receiving execution unit, a second receiving execution unit, and a third receiving execution unit. The sending unit is configured to send a connection deletion request message to an S-GW in the case of a fault, where the connection deletion request message includes a global packet data network connection identifier FQ-CSID. The first receiving execution unit is configured to: when all packet data network (PDN) connections of a user equipment (UE) related to the fault are locally deleted, receive a first message sent by the S-GW, and trigger the UE to initiate an attach procedure. The second receiving execution unit is configured to receive, when partial PDN connections of the UE related to the fault are locally deleted, a second message sent by the S-GW, and perform a PDN connection reestablishment procedure. The third receiving execution unit is configured to receive, when partial PDN connections of the UE related to the fault are locally deleted, a third message sent by the S-GW, and perform a network-triggered service request procedure.

A UE includes a receiving unit and an executing unit. The receiving unit is configured to receive a paging message carrying a second identifier sent by a network device. The executing unit is configured to perform a service request procedure and reestablish a PDN connection.

A system for processing device faults includes a network device and a serving gateway S-GW. The network device is configured to send a connection deletion request message in the case of a fault, where the connection deletion request message includes global packet data network connection identifier information FQ-CSID.

The S-GW is configured to receive the connection deletion request message, locally delete a packet data network PDN connection related to the FQ-CSID, or retain a PDN connection related to the FQ-CSID and receive downlink data sent by a packet data network gateway (P-GW) and corresponding to the PDN connection, and perform a network-triggered service recovery procedure.

Embodiments of the present invention provide a method, an apparatus, and a system for processing device faults. After a fault occurs on a network device, a S-GW, upon receiving a connection deletion request message carrying an FQ-CSID, locally deletes or retains a PDN connection related to the FQ-CSID, and instructs, by sending a first message or a second message or a third message to the network device, the network device to trigger a UE to initiate an attach procedure or to perform a PDN connection reestablishment procedure or a service request procedure triggered by a network side. The network device triggers the UE to initiate the attach procedure, so that the UE reestablishes all PDN connections of the UE; or the network device performs the PDN connection reestablishment procedure or the service request procedure triggered by a network side for triggering the UE to reestablish partial PDN connections of the UE related to the device fault. In this way, the UE may be informed to recover the PDN connections related to the device fault in a timely manner, thereby implementing timely recovery of PDN connections related to the device fault and improving user's service experience.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
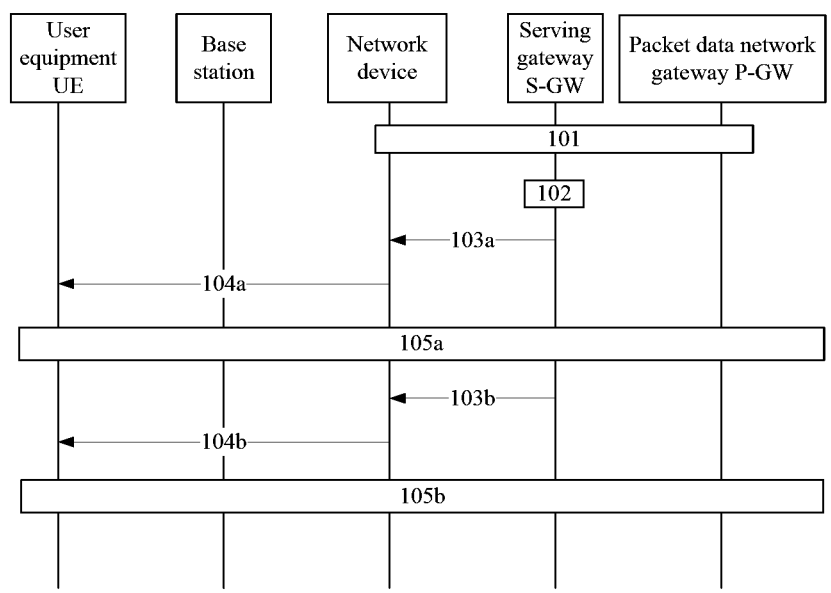
FIG. 1 is a schematic diagram of a method for processing device faults according to an embodiment of the present invention.

An embodiment of the present invention provides a method for processing device faults. As shown in FIG. 1, the method includes the following steps:

101. A network device, a S-GW, and a P-GW locally delete a PDN connection related to a device fault.

It should be noted that the network device in all embodiments of the present invention is an MME or an SGSN.

102. The S-GW determines whether all or partial PDN connections of a user equipment UE are locally deleted by the network device. If all PDN connections are locally deleted by the network device, steps 103a-105a are performed. If partial PDN connections are locally deleted by the network device, steps 103b-105b are performed.

103a. The S-GW sends a first message to the network device, where the first message is used to instruct the network device to trigger the UE to initiate an attach procedure; and the network device receives the first message.

Specifically, after determining that all PDN connections of the UE are deleted by the network device, the S-GW sends a first message to the network device, for instructing the network device to trigger the UE to initiate an attach procedure. Preferably, the first message carries a first identifier. Further, preferably, the first identifier is an IMSI (international mobile subscriber identification number).

104a. The network device triggers the UE to initiate the attach procedure.

Specifically, the network device sends a paging message to the UE, for triggering the UE to initiate an attach procedure to reestablish all PDN connections (PDN connections related to the device fault and deleted by the network side); the paging message carries a first identifier, and the paging message carrying the first identifier is used to instruct the UE to initiate an attach procedure. Preferably, the first identifier is an IMSI.

105a. The UE initiates the attach procedure.

Specifically, after receiving the paging message from the network device and detecting that the message carries the first identifier, the UE initiates an attach procedure to reestablish all PDN connections of the UE.

103b. The S-GW sends a third message to the network device, where the third message is used to trigger the network device to perform a service request procedure triggered by the network side; and the network device receives the third message.

Specifically, when determining that the UE is in idle state, the S-GW sends the third message to the network device, for triggering the network device to perform the service request procedure triggered by the network side.

If the UE is in connected state, the third message carries instruction information for instructing the network device to change the UE from connected state to idle state.

It should be noted that in all embodiments of the present invention, for the S-GW, if a saved UE context does not have available downlink user plane information, the S-GW is capable of determining that the UE is in idle state, and the third message does not carry the above instruction information. In this case, the third message is only used to trigger the network device to perform the service request message triggered by the network side.

104b. The network device performs the service request procedure triggered by the network side.

Specifically, after the network device receives the third message, if the UE is in idle state, the network device sends a paging message to the UE, where the paging message is added with a second identifier, and the paging message carrying the second identifier is used to instruct the UE to perform the service request procedure. Preferably, the second identifier is an S-TMSI (serving temporary mobile subscriber identity).

If the network device has the capability of detecting the UE state (including connected state and idle state), the network device changes the UE from connected state to idle state when detecting that the UE is in connected state. Or, no matter whether the network device has the capability of detecting the UE state, the network device is capable of obtaining the UE state according to the third message received from the S-GW. Specifically, the network device receives the third message carrying instruction information sent by the S-GW, where the instruction information is used to instruct the network device to change the UE from connected state to idle state. In this case, the network changes the UE from connected state to idle state.

If the network device is an MME, when the UE is in connected state, the connection between the MME and a base station is an S1 connection. In this case, the MME may change the UE from connected state to idle state by releasing the S1 connection. If the network device is an SGSN, when the UE is in connected state, the connection between the SGSN and a radio network controller is an Iu connection. In this case, the SGSN may change the UE from connected state to idle state by releasing the Iu connection.

The following description is based on an example of releasing an S1 connection by the MME.

The MME sends an S1 connection release request message to the base station, requesting release of the S1 connection. After receiving the request message, the base station releases the S1 connection and returns an S1 connection release confirmation message to the MME, indicating the completion of the release of the S1 connection of the MME. After the S1 connection of the MME is released, the MME changes the UE from connected state to idle state.

105b. The UE performs the service request procedure and reestablishes partial PDN connections.

Specifically, after receiving the paging message carrying a second identifier, the UE initiates the service request procedure to the network device. In the service request procedure, the UE performs bearer synchronization with the network device to determine the partial PDN connections deleted by the network device, and then locally deletes the corresponding partial PDN connections. After deleting the partial PDN connections, the UE re-initiates a PDN connection establishment procedure to reestablish partial PDN connections.

The following uses bearer synchronization between the MME and the UE as an example to describe how the UE determines the partial PDN connections deleted by the network device.

After receiving a service request message from the UE, the MME triggers recovery of a corresponding radio bearer according to UE bearer information stored on the MME. Because a device fault causes the MME to delete partial PDN connections related to the device fault, the radio bearer corresponding to the partial PDN connections (PDN connections related to the device fault and deleted by the network side) cannot be recovered. Therefore, in the service request procedure, if a radio bearer corresponding to the PDN connection bearer stored on the UE is not recovered, the UE is capable of determining that the PDN connection has been deleted by the network side, and thereby locally deletes the unrecovered PDN connection.

It should be noted that in the embodiment of the present invention, the partial PDN connections that need to be reestablished by the UE are the partial PDN connections of the UE related to the device fault.

The embodiment of the present invention provides a method for processing device faults. After a fault occurs on a network device, a S-GW, upon receiving of a connection deletion request message carrying an FQ-CSID, locally deletes a PDN connection related to the FQ-CSID, and instructs, by sending a first message or a third message to the network device, the network device to trigger a UE to initiate an attach procedure or to perform a service request procedure triggered by a network side. The network device triggers the UE to initiate an attach procedure, so that the UE reestablishes all PDN connections of the UE; or the network device performs the service request procedure triggered by the network side for triggering the UE to reestablish partial PDN connections of the UE related to the device fault. In this way, after a fault occurs on the network device, the PDN connections related to the device fault can be recovered in a timely manner, which improves user's service experience.

Embodiment 2

Figure 2:
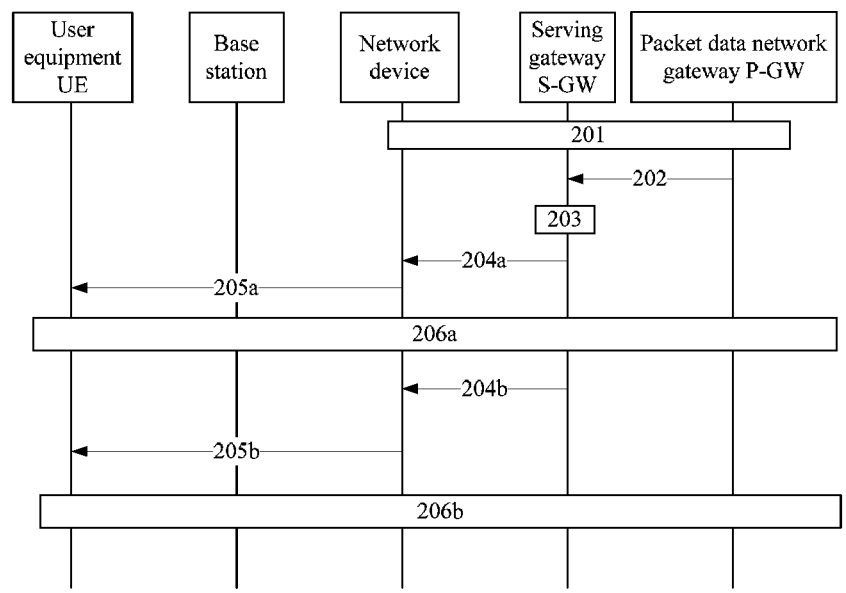
FIG. 2 is a schematic diagram of another method for processing device faults according to an embodiment of the present invention.

An embodiment of the present invention provides a method for processing device faults. As shown in FIG. 2, the method includes the following steps:

201. A network device locally deletes a PDN connection related to a device fault, and a S-GW and a P-GW temporarily retain the PDN connection related to the device fault.

Specifically, the network device locally deletes all PDN connections related to the device fault, and the S-GW and P-GW temporarily retain these PDN connections related to the device fault and use a special flag to mark these PDN connections related to the device fault. Preferably, a timer is used as a special flag to mark all PDN connections related to the device fault. If the timer expires, the S-GW and P-GW locally delete these PDN connections related to the device fault.

202. The S-GW receives downlink data corresponding to the PDN connection.

203. The S-GW determines whether all or partial PDN connections of a user equipment UE are locally deleted by the network device. If all PDN connections are locally deleted by the network device, steps 204a-206a are performed. If partial PDN connections are locally deleted by the network device, steps 204b-206b are performed.

204a. The S-GW sends a first message to the network device, where the first message is used to instruct the network device to trigger the UE to initiate an attach procedure; and the network device receives the first message.

Specifically, after determining that all PDN connections of the UE are locally deleted by the network device, the S-GW sends a first message to the network device, for instructing the network device to trigger the UE to initiate an attach procedure to reestablish all PDN connections of the UE. Preferably, the first message carries a first identifier. Further, preferably, the first identifier is an IMSI.

It should be noted that the S-GW may determine whether all PDN connections of the UE are locally deleted by the network device by using the special flag in step 201.

205a. The network device triggers the UE to initiate the attach procedure.

Specifically, the network device sends a paging message to the UE, for triggering the UE to initiate an attach procedure to reestablish the deleted PDN connections; the paging message carries the first identifier, and the paging message carrying the first identifier is used to instruct the UE to initiate an attach procedure. Preferably, the first identifier is an IMSI.

206a. The UE initiates the attach procedure.

Specifically, after receiving the paging message from the network device and detecting that the message carries the first identifier, the UE initiates an attach procedure to reestablish all PDN connections of the UE.

204b. The S-GW sends a third message to the network device, where the third message is used to trigger the network device to perform a service request procedure triggered by a network side; and the network device receives the third message.

Specifically, when determining that the UE is in idle state, the S-GW sends the third message to the network device, for triggering the network device to perform the service request procedure triggered by the network side.

If the UE is in connected state, the third message carries instruction information for instructing the network device to change the UE from connected state to idle state.

205b. The network device performs the service request procedure triggered by the network side.

Specifically, after the network device receives the third message, if the UE is in idle state, the network device sends a paging message to the UE, where the paging message is added with a second identifier, for instructing the UE to perform the service request procedure. Preferably, the second identifier is an S-TMSI.

If the network device has the capability of detecting the UE state (including the connected state and idle state), the network device changes the UE from connected state to idle state when detecting that the UE is in connected state. Or, no matter whether the network device has the capability of detecting the UE state, the network device is capable of obtaining the UE state according to the third message received from the S-GW. Specifically, the network device receives the third message carrying instruction information sent by the S-GW, where the instruction information is used to instruct the network device to change the UE from connected state to idle state. In this case, the network changes the UE from connected state to idle state.

If the network device is an MME, when the UE is in connected state, the connection between the MME and a base station is an S1 connection. In this case, the MME may change the UE from connected state to idle state by releasing the S1 connection. If the network device is an SGSN, when the UE is in connected state, the connection between the SGSN and a radio network controller is an Iu connection. In this case, the SGSN may change the UE from connected state to idle state by releasing the Iu connection.

206b. The UE performs the service request procedure and reestablishes partial PDN connections.

Specifically, after receiving the paging message carrying a second identifier, the UE initiates the service request procedure to the network device. In the service request procedure, the UE performs bearer synchronization with the network device to determine the partial PDN connections deleted by the network device, and then locally deletes the corresponding partial PDN connections, and re-initiates the PDN connection establishment procedure to reestablish the partial PDN connections.

It should be noted that after the partial PDN connections are reestablished successfully, and a special flag locally used by the S-GW and P-GW to mark a temporarily retained PDN connection related to the device fault is still valid, the S-GW locally deletes the temporarily retained PDN connection related to the device fault and informs the P-GW to delete the temporarily retained PDN connection related to the device fault. For example, the S-GW and P-GW use a timer (as a special flag) to mark a temporarily retained PDN connection related to the device fault. Before the timer expires, when the S-GW receives downlink data response information, the S-GW locally deletes the temporarily retained PDN connection related to the device fault, and informs the P-GW to delete the temporarily retained PDN connection related to the device fault.

It should be noted that in the embodiment of the present invention, the partial PDN connections that need to be reestablished by the UE are the partial PDN connections related to the network device fault.

The embodiment of the present invention provides a method for processing device faults. After a fault occurs on the network device, a S-GW, upon receiving a connection deletion request message carrying an FQ-CSID, temporarily retains a PDN connection related to the FQ-CSID, and sends a first message or a third message to the network device, for instructing the network device to trigger a UE to initiate an attach procedure or to perform a service request procedure triggered by a network side. The network device triggers the UE to initiate an attach procedure, so that the UE initiates the attach procedure and reestablishes all PDN connections of the UE; or the network device performs the service request procedure triggered by the network side for triggering the UE to reestablish partial PDN connections of the UE related to the device fault. In this way, after a fault occurs on the network device, the PDN connections related to the device fault can be recovered in a timely manner, which improves user's service experience.

Embodiment 3

Figure 3:
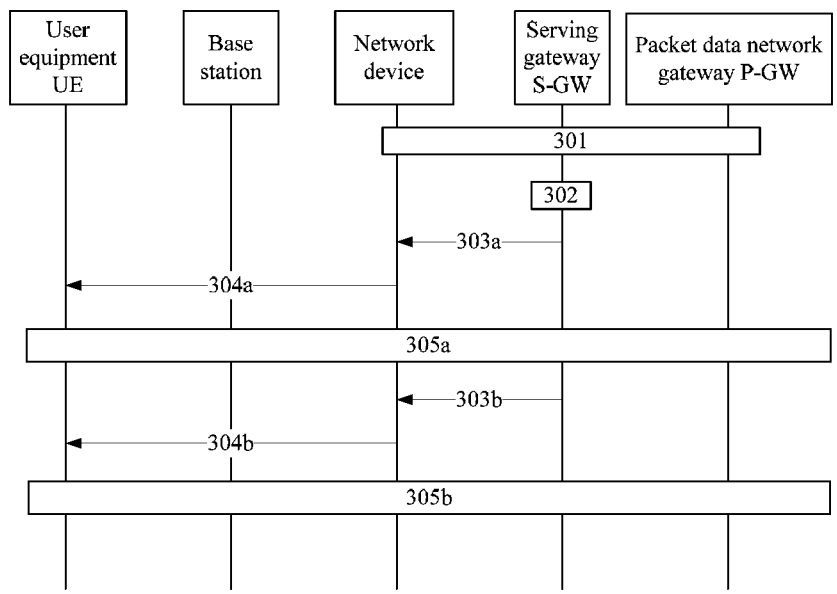
FIG. 3 is a schematic diagram of still another method for processing device faults according to an embodiment of the present invention.

An embodiment of the present invention provides a method for processing device faults. As shown in FIG. 3, the method includes the following steps:

301. A network device, a S-GW, and a P-GW locally delete a PDN connection related to a device fault.

302. The S-GW determines whether all or partial PDN connections of a user equipment UE are locally deleted by the network device. If all PDN connections are locally deleted by the network device, steps 303a-305a are performed. If partial PDN connections are locally deleted by the network device, steps 303b-305b are performed.

303*a*. The S-GW sends a first message to the network device, where the first message is used to instruct the network device to trigger the UE to initiate an attach procedure; and the network device receives the first message.

Specifically, after determining that all PDN connections of the UE are deleted by the network device, the S-GW sends a first message to the network device, for instructing the network device to trigger the UE to initiate an attach procedure to reestablish all PDN connections of the UE. Preferably, the first message carries a first identifier. Further, preferably, the first identifier is an IMSI.

304*a*. The network device triggers the UE to initiate the attach procedure.

Specifically, the network device sends a paging message to the UE, for triggering the UE to initiate an attach procedure to reestablish all PDN connections; the paging message carries the first identifier, and the paging message carrying the first identifier is used to instruct the UE to initiate an attach procedure. Preferably, the first identifier is an IMSI.

305*a*. The UE initiates the attach procedure.

Specifically, after receiving the paging message from the network device and detecting that the message carries the first identifier, the UE initiates an attach procedure to reestablish all PDN connections of the UE.

303*b*. The S-GW sends a second message to the network device, where the second message is used to instruct the network device to perform a PDN connection reestablishment procedure; and the network device receives the second message.

Specifically, the S-GW sends the second message to the network device, for instructing the network device to perform the PDN connection reestablishment procedure. The second message carries a default bearer identifier corresponding to the partial PDN connections of the UE related to the device fault.

304*b*. The network device performs the PDN connection reestablishment procedure.

Specifically, when the UE is in connected state, after the network device receives the second message and detects the default bearer identifier corresponding to the partial PDN connections in the second message, the network device sends a request message to the UE in connected state, for instructing the UE to reestablish the partial PDN connections, where the request message carries the default bearer identifier that is used to indicate the partial PDN connections. Preferably, the request message also carries a cause value "reactivate".

If the UE is in idle state, the network device changes the UE from idle state to connected state. Specifically, the network device sends a paging message to the UE, where the paging message carries a second identifier, for instructing the UE to perform the service request procedure. Preferably, the second identifier is an S-TMSI. After receiving the paging message carrying a second identifier, the UE performs the service request procedure and sends a service request procedure request message to the network device. The network device receives the service request procedure request message from the UE and changes the UE from idle state to connected state. After changing the UE from idle state to connected state, the network device sends a request message to the UE in connected state, for instructing the UE to reestablish partial PDN connections.

305*b*. The UE initiates a PDN connection establishment procedure.

Specifically, according to step 304*b*, after the UE receives the request message for instructing the UE to reestablish partial PDN connections from the network device, where the request message carries a default bearer identifier that is used to indicate partial PDN connections, the UE learns from the request information that partial PDN connections are deleted by the network side and obtains the default bearer identifier for the partial PDN connections. The UE locally deletes the partial PDN connections and initiates the PDN connection establishment procedure to reestablish the partial PDN connections.

The embodiment of the present invention provides a method for processing device faults. After a fault occurs on a network device, a S-GW, upon receiving a connection deletion request message carrying an FQ-CSID, locally deletes a PDN connection related to the FQ-CSID, and instructs, by sending a first message or a second message to the network device, the network device to trigger a UE to initiate an attach procedure or to perform a PDN connection reestablishment procedure. The network device triggers the UE to initiate an attach procedure, so that the UE initiates the attach procedure to reestablish all PDN connections of the UE, or the network device performs the PDN connection reestablishment procedure for triggering the UE to initiate the PDN connection establishment procedure to reestablish partial PDN connections of the UE related to the device fault. In this way, after a fault occurs on the network device, the PDN connections related to the device fault can be recovered in a timely manner, which improves user's service experience.

Embodiment 4

Figure 4:
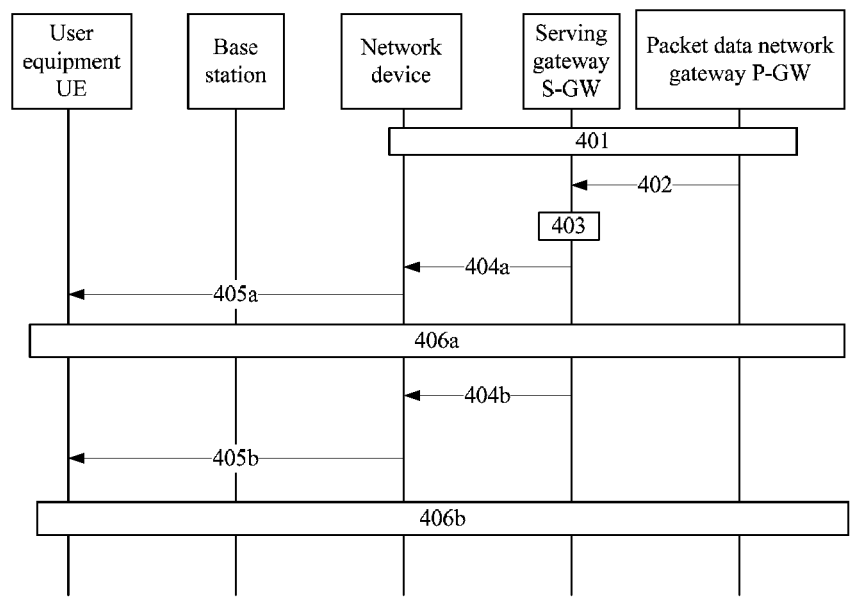
FIG. 4 is a schematic diagram of yet another method for processing device faults according to an embodiment of the present invention.

An embodiment of the present invention provides a method for processing device faults. As shown in FIG. 4, the method includes the following steps:

401. A network device locally deletes a PDN connection related to a device fault, and a S-GW and a P-GW temporarily retain the PDN connection related to the device fault.

Specifically, the network device locally deletes the PDN connection related to the device fault, and the S-GW and P-GW temporarily retain the PDN connection related to the device fault and use a special flag to mark the PDN connection related to the device fault. Preferably, a timer is used as a special flag to mark all PDN connections related to the device fault.

402. The S-GW receives downlink data corresponding to the PDN connection.

403. The S-GW determines that all or partial PDN connections of a user equipment UE are locally deleted by the network device. If all PDN connections of the UE are locally deleted by the network device, steps 404*a*-406*a* are performed. If partial PDN connections are locally deleted by the network device, steps 404*b*-406*b* are performed.

404*a*. The S-GW sends a first message to the network device, where the first message is used to instruct the network device to trigger the UE to initiate an attach procedure; and the network device receives the first message.

Specifically, after determining that all PDN connections of the UE are locally deleted by the network device, the S-GW sends a first message to the network device, for instructing the network device to trigger the UE to initiate an attach procedure to reestablish all PDN connections of the UE. Preferably, the first message carries a first identifier. Further, preferably, the first identifier is an IMSI.

It should be noted that the S-GW may determine whether all PDN connections of the UE are locally deleted by the network device by using the special flag in step 401.

405*a*. The network device triggers the UE to initiate the attach procedure.

Specifically, the network device sends a paging message to the UE, for triggering the UE to initiate an attach procedure to reestablish all PDN connections of the UE. The paging message carries the first identifier. The paging message carrying the first identifier is used to instruct the UE to initiate an attach procedure. Preferably, the first identifier is an IMSI.

406a. The UE initiates the attach procedure.

Specifically, after receiving the paging message from the network device and detecting that the message carries the first identifier, the UE initiates an attach procedure to reestablish all PDN connections of the UE.

404b. The S-GW sends a second message to the network device, where the second message is used to instruct the network device to perform a PDN connection reestablishment procedure; and the network device receives the second message.

Specifically, the S-GW sends the second message to the network device, for instructing the network device to perform the PDN connection reestablishment procedure. The second message carries a default bearer identifier corresponding to the partial PDN connections of the UE related to the device fault.

405b. The network device performs the PDN connection reestablishment procedure.

Specifically, when the UE is in connected state, after the network device receives the second message and detects the default bearer identifier corresponding to the partial PDN connections in the second message, the network device sends a request message to the UE in connected state, for instructing the UE to reestablish the partial PDN connections. The request message carries the default bearer identifier that is used to indicate the partial PDN connections. Preferably, the request message also carries a cause value "reactivate".

If the UE is in idle state, the network device changes the UE from idle state to connected state. Specifically, the network device sends a paging message to the UE, where the paging message carries a second identifier, for instructing the UE to perform the service request procedure. Preferably, the second identifier is an S-TMSI. After receiving the paging message carrying a second identifier, the UE performs the service request procedure and sends a service request procedure request message to the network device. The network device receives the service request procedure request message from the UE and changes the UE from idle state to connected state. After changing the UE from idle state to connected state, the network device sends a request message to the UE in connected state, for instructing the UE to reestablish partial PDN connections.

406b. The UE initiates a PDN connection establishment procedure.

Specifically, according to step 405b, after the UE receives the request message for instructing the UE to reestablish partial PDN connections from the network device, where the request message carries a default bearer identifier that is used to indicate partial PDN connections, the UE learns from the request information that partial PDN connections are deleted by the network device and obtains the default bearer identifier for the partial PDN connections. The UE locally deletes the partial PDN connections and initiates a PDN connection establishment procedure to reestablish the partial PDN connections.

It should be noted that after the deleted PDN connections are reestablished successfully, and the special flag locally used by the S-GW and P-GW to mark the temporarily retained PDN connection related to the device fault is still valid, the S-GW locally deletes temporarily retained PDN connections related to the device fault and informs the P-GW to locally delete the temporarily retained PDN connections related to the device fault. For example, the S-GW and P-GW use a timer (as a special flag) to mark the PDN connections related to the device fault that are temporarily retained. Before the timer expires, when the S-GW receives downlink data response information, the S-GW locally deletes the temporarily retained PDN connections related to the device fault, and informs the P-GW to locally delete the temporarily retained PDN connections related to the device fault.

The embodiment of the present invention provides a method for processing device faults. After a fault occurs on the network device, a S-GW, upon receiving a connection deletion request message carrying an FQ-CSID, temporarily retains a PDN connection related to the FQ-CSID, and instructs, by sending a first message or a second message to the network device, the network device to perform a PDN connection reestablishment procedure or a service request procedure triggered by a network side. The network device triggers the UE to initiate an attach procedure or is informed to perform a PDN connection reestablishment procedure. The network device triggers the UE to initiate an attach procedure, and the UE triggers the attach procedure to reestablish all PDN connections of the UE; or the network device performs a PDN connection reestablishment procedure for triggering the UE to reestablish partial PDN connections related to the device fault of the UE. In this way, after a fault occurs on the network device, the PDN connections related to the device fault can be recovered in a timely manner, which improves user's service experience.

The present invention further provides an apparatus corresponding to the above device fault processing method.

Figure 5:
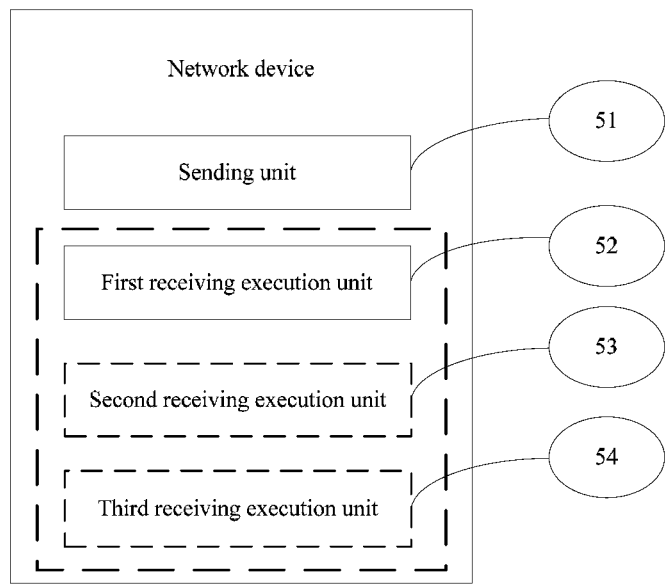
FIG. 5 is a schematic structural diagram of a network device according to an embodiment of the present invention.

An embodiment of the present invention provides a network device. As shown in FIG. 5, the device includes a sending unit 51 and at least one of a first receiving execution unit 52, a second receiving execution unit 53, and a third receiving execution unit 54.

The sending unit 51 is configured to send a connection deletion request message to a serving gateway S-GW in the case of a fault, where the connection deletion request message includes a global packet data network connection identifier FQ-CSID.

The first receiving execution unit 52 is configured to receive, when all packet data network PDN connections of a user equipment UE related to the fault are locally deleted, a first message sent by the S-GW, and trigger the UE to initiate an attach procedure.

The second receiving execution unit 53 is configured to receive, when partial PDN connections of the UE related to the fault are locally deleted, a second message sent by the S-GW, and perform a PDN connection reestablishment procedure.

The third receiving execution unit 54 is configured to receive, when partial PDN connections of the UE related to the fault are locally deleted, a third message sent by the S-GW, and perform a service request procedure triggered by a network side.

Figure 6:
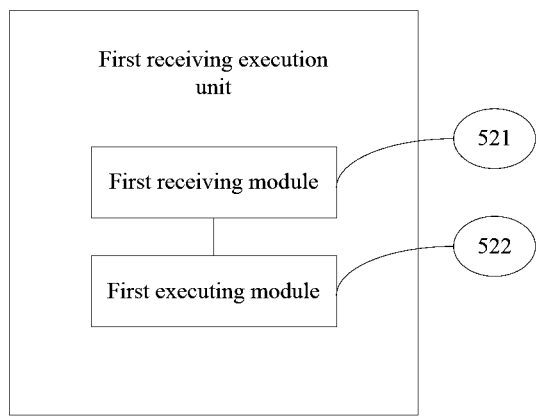
FIG. 6 is a schematic structural diagram of a first receiving execution unit of the network device shown in FIG. 5.

Specifically, as shown in FIG. 6, the first receiving execution unit includes a first receiving module 521 and a first executing module 522.

The first receiving module 521 is configured to receive the first message sent by the S-GW.

The first executing module 522 is configured to send a paging message carrying a first identifier, for triggering the UE to initiate an attach procedure.

The paging message carrying a first identifier is used to instruct the UE to initiate an attach procedure.

Figure 7:
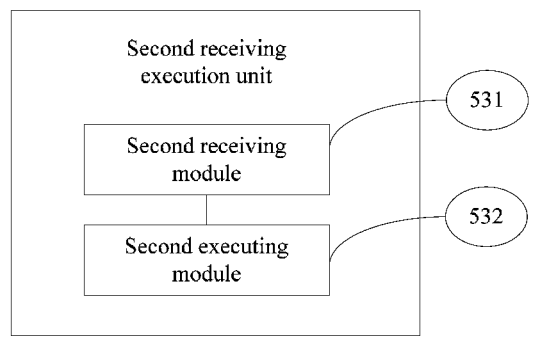
FIG. 7 is a schematic structural diagram of a second receiving execution unit of the network device shown in FIG. 5.

As shown in FIG. 7, the second receiving execution unit includes a second receiving module 531 and a second executing module 532.

The second receiving module 531 is configured to receive the second message sent by the S-GW, where the second message carries a default bearer identifier corresponding to partial PDN connections.

The second executing module 532 is configured to send a request message to the UE for instructing the UE to reestablish the partial PDN connections, where the request message carries a default bearer identifier that is used to indicate the partial PDN connections.

Figure 8:
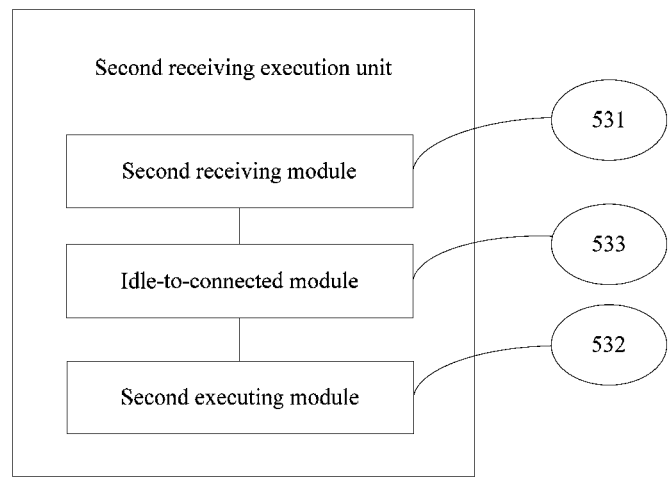
FIG. 8 is another schematic structural diagram of a second receiving execution unit of the network device shown in FIG. 5.

As shown in FIG. 8, the second receiving execution unit 53 further includes:

an idle-to-connected module 533, configured to change, before the second executing module 532 sends the request message to the UE for instructing the UE to reestablish partial PDN connections, the UE from idle state to connected state when the UE is in idle state.

Specifically, when the UE is in idle state, the idle-to-connected module 533 sends a paging message carrying a second identifier to the UE, where the paging message carrying a second identifier is used to instruct the UE to perform a service request procedure; receives a service request procedure request message sent by the UE after the UE receives the paging message; and changes the UE from idle state to connected state.

Figure 9:
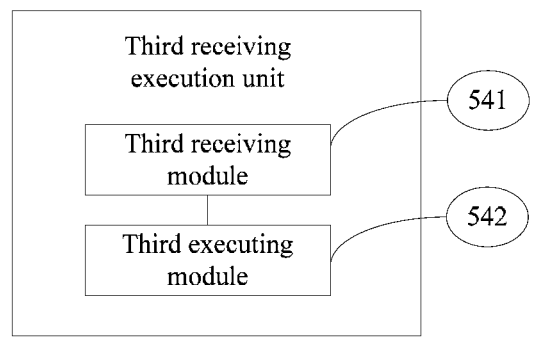
FIG. 9 is a schematic structural diagram of a third receiving execution unit of the network device shown in FIG. 5.

As shown in FIG. 9, the third receiving execution unit includes a third receiving module 541 and a third executing module 542.

The third receiving module 541 is configured to receive the third message sent by the S-GW.

Preferably, the third message carries instruction information that is used to trigger the network device to change the UE from connected state to idle state.

The third executing module 542 is configured to send a paging message carrying a second identifier to the UE, where the paging message carrying a second identifier is used to instruct the UE to perform a service request procedure.

Figure 10:
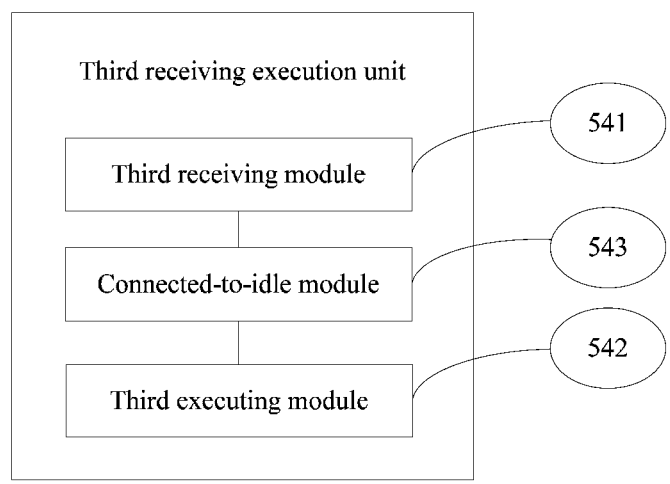
FIG. 10 is another schematic structural diagram of a third receiving execution unit of the network device shown in FIG. 5.

As shown in FIG. 10, the third receiving execution unit 54 further includes:

a connected-to-idle module 543, configured to change, before the third executing module 542 sends the paging message carrying a second identifier to the UE, the UE from connected state to idle state when the UE is in connected state.

Specifically, if the network device is an MME, when the UE is in connected state, the connected-to-idle module 543 releases an S1 connection so that the UE changes from connected state to idle state.

If the network device is an SGSN, when the UE is in connected state, the connected-to-idle module 543 releases an Iu connection so that the UE changes from connected state to idle state.

Figure 11:
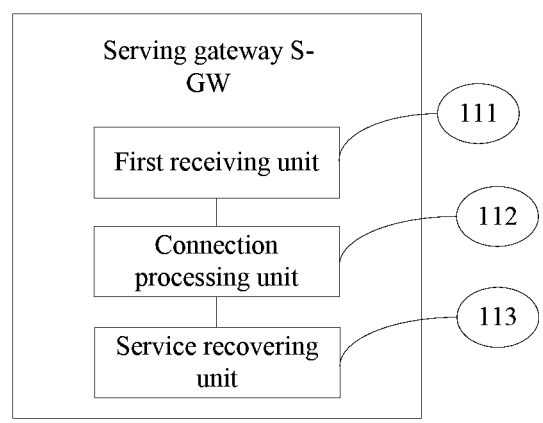
FIG. 11 is a schematic structural diagram of a S-GW according to an embodiment of the present invention.

As shown in FIG. 11, a S-GW includes:

a first receiving unit 111, configured to receive a connection deletion request message sent by a network device in the case of a fault, where the connection deletion request message includes a global packet data network connection identifier FQ-CSID;

a connection processing unit 112, configured to locally delete a packet data network PDN connection related to the FQ-CSID, or retain a PDN connection related to the FQ-CSID and receive downlink data corresponding to the PDN connection; and a service recovering unit 113, configured to perform a network-triggered service recovery procedure.

Figure 12:
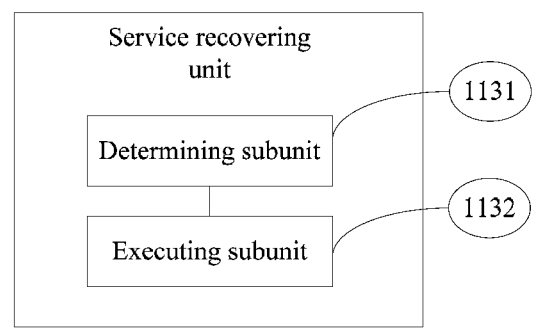
FIG. 12 is a schematic structural diagram of a service recovering unit of the S-GW shown in FIG. 11.

As shown in FIG. 12, the service recovering unit 113 includes a determining subunit 1131 and an executing subunit 1132.

The determining subunit 1131 is configured to determine, according to the FQ-CSID, whether all PDN connections of a UE related to the fault are locally deleted by the network device or partial PDN connections of the UE related to the fault are locally deleted by the network device.

The executing subunit 1132 is configured to send, when the determining subunit 1131 determines that all PDN connections of the UE are locally deleted by the network device, a first message to the network device for instructing the network device to trigger the UE to initiate an attach procedure. Or, when the determining subunit 1131 determines that partial PDN connections of the UE are locally deleted by the network device, the executing subunit 1132 is configured to send a second message to the network device for instructing the network device to perform a PDN connection reestablishment procedure, where the second message carries a default bearer identifier corresponding to the partial PDN connections that need to be reestablished; or is configured to send a third message to the network device for instructing the network device to perform a service request procedure triggered by a network side.

Figure 13:
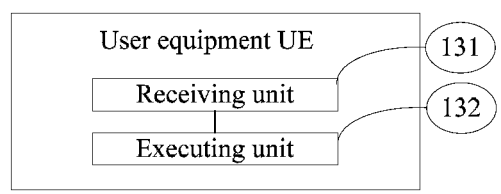
FIG. 13 is a schematic structural diagram of a UE according to an embodiment of the present invention.

As shown in FIG. 13, a UE includes:

a receiving unit 131, configured to receive a paging message carrying a second identifier sent by a network device, where the paging message carrying a second identifier is used to instruct the UE to perform a service request procedure; and an executing unit 132, configured to perform a service request procedure and reestablish a PDN connection.

Figure 14:
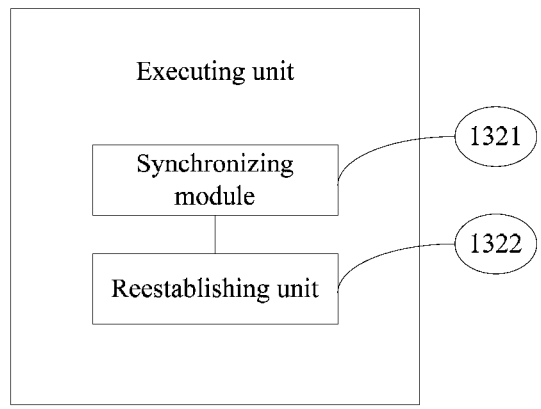
FIG. 14 is a schematic structural diagram of an executing unit of the UE shown in FIG. 13.

Specifically, as shown in FIG. 14, the executing unit 132 includes a synchronizing module 1321 and a reestablishing module 1322.

The synchronizing module 1321 is configured to perform bearer synchronization with the network device and determine a PDN connection that need to be reestablished.

The reestablishing module 1322 is configured to initiate a PDN connection establishment procedure to reestablish the PDN connection that need to be reestablished.

The embodiment of the present invention provides an apparatus for processing device faults. After a fault occurs on a network device, a serving gateway S-GW, upon receiving a connection deletion request message carrying an FQ-CSID, locally deletes or retains a PDN connection related to the FQ-CSID, and instructs, by sending a first message or a second message or a third message to the network device, the network device to trigger the UE to initiate an attach procedure or to perform a PDN connection reestablishment procedure or a service request procedure triggered by a network side. The network device triggers the UE to initiate an attach procedure to reestablish all PDN connections of the UE; or the network device performs the PDN connection reestablishment procedure or the service request procedure triggered by the network side for triggering the UE to reestablish the partial PDN connections of the UE related to the device fault. In this way, the UE may be informed to recover the PDN connections related to the device fault in a timely manner, thereby implementing timely recovery of PDN connections related to the device fault and improving user's service experience.

Figure 15:
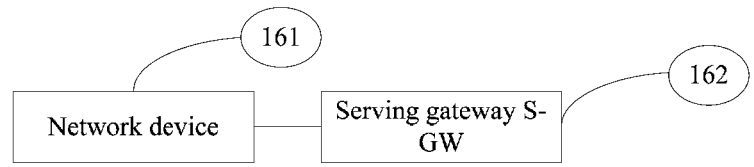
FIG. 15 is a schematic structural diagram of a system for processing device faults according to an embodiment of the present invention.

As shown in FIG. 15, a system for processing device faults includes a network device 161 and a serving gateway S-GW 162. Specifically, the network device 161 is configured to send a connection deletion request message in the case of a fault, where the connection deletion request message includes a global packet data network connection identifier FQ-CSID.

The S-GW 162 is configured to receive the connection deletion request message, locally delete a packet data network PDN connection related to the FQ-CSID, or retain a PDN connection related to the FQ-CSID and receive downlink data sent by a packet data network gateway P-GW and corresponding to the PDN connection, and send a message to the network device for instructing the network device to perform a network-triggered service recovery procedure.

Figure 16:
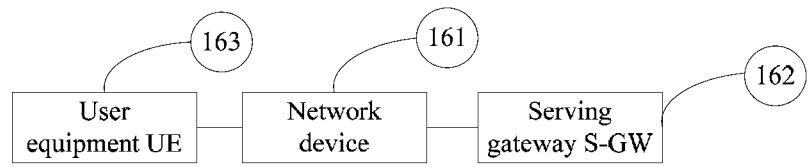
FIG. 16 is a schematic structural diagram of another system for processing device faults according to an embodiment of the present invention.

As shown in FIG. 16, the system for processing device faults further includes a UE 163.

Specifically, the performing, by the S-GW 162, a network-trigger service recovery procedure includes: when the network device 161 locally deletes all PDN connections of the UE 163 related to the fault, sending, by the S-GW 162, a first message to the network device 161; receiving, by the network device 161, the first message; sending, by the network device 161, a paging message carrying a first identifier to the UE 163, where the paging message carrying a first identifier is used to trigger the UE 163 to initiate an attach procedure; and initiating, by the UE 163, an attach procedure; or, when the network device 161 locally deletes partial PDN connections of the UE 163 related to the fault, sending, by the S-GW 162, a second message to the network device 161, where the second message carries a default bearer identifier corresponding to the partial PDN connections; receiving, by the network device 161, the second message; sending, by the network device 161, a request message to the UE 163 for instructing the UE 163 to reestablish the partial PDN connections, where the request message carries a default bearer identifier that is used to indicate the partial PDN connections; and initiating, by the UE 163, a PDN connection establishment procedure to reestablish the partial PDN connections; or, when the network device 161 locally deletes the partial PDN connections of the UE 163 related to the fault, sending, by the S-GW 162, a third message to the network device 161; receiving, by the network device 161, the third message; sending, by the network device 161, a paging message carrying a second identifier to the UE, where the paging message carrying a second identifier is used to instruct the UE 163 to perform a service request procedure and reestablish the partial PDN connections; and after receiving the paging message carrying a second identifier, performing, by the UE 163, a service request procedure and reestablishing the partial PDN connections.

The embodiment of the present invention provides a system for processing device faults. After a fault occurs on a network device, a S-GW, upon receiving a connection deletion request message carrying an FQ-CSID, locally deletes or retains a PDN connection related to the FQ-CSID, and instructs, by sending a first message or a second message or a third message to the network device, the network device to trigger the UE to initiate an attach procedure or to perform a PDN connection reestablishment procedure or a service request procedure triggered by a network side. The network device triggers the UE to initiate an attach procedure, so that the UE initiates an attach procedure to reestablish all PDN connections of the UE; or the network device performs a PDN connection reestablishment procedure or a service request procedure triggered by the network side for triggering the UE to reestablish partial PDN connections of the UE related to the device fault. In this way, the UE may be informed to recover the PDN connections related to the device fault in a timely manner, thereby implementing timely recovery of PDN connections related to the device fault and improving user's service experience.

The foregoing descriptions are merely exemplary embodiments of the present invention, but are not intended to limit the protection scope of the present invention. Any variation or replacement made by persons skilled in the art within the technical scope disclosed in the present invention shall fall within the protection scope of the present invention. Therefore, the protection scope of the present invention shall be subject to the claims.

What is claimed is:

1. A method, comprising:
sending, by a network device, a connection deletion request message to a serving gateway (S-GW) when a fault occurs, wherein the connection deletion request message comprises a fully qualified connection set identifier (FQ-CSID), wherein the FQ-CSID indicates a set of packet data network (PDN) connections which is locally deleted by the network device, and the FQ-CSID is used by the S-GW to determine whether all or partial PDN connections of a user equipment (UE) are locally deleted by the network service;
when it is determined that all PDN connections of the UE are locally deleted by the network device, receiving, by the network device, a first message sent by the S-GW to instruct the network device to trigger the UE to initiate an attach procedure and triggering, by the network device, the UE to initiate the attach procedure; or
when it is determined that partial PDN connections of the UE are locally deleted by the network device, receiving, by the network device, a second message sent by the S-GW to instruct the network device to trigger the UE to reestablish the deleted partial PDN connections and triggering, by the network device, the UE to reestablish the deleted partial PDN connections.

2. The method according to claim 1, wherein the first message comprises a UE identifier,
the triggering the UE to initiate the attach procedure comprises:
sending, by the network device, a paging message carrying the UE identifier to the UE to trigger the UE to initiate the attach procedure.

3. The method according to claim 1, wherein the second message comprises a default bearer identifier corresponding to the deleted partial PDN connections,
the triggering the UE to reestablish the deleted partial PDN connections comprises:
when the UE is in a connected state, sending, by the network device, a request message to the UE to trigger the UE to initiate a PDN connection establishment procedure to reestablish the deleted partial PDN connections, wherein the request message carries the default bearer identifier.

4. The method according to claim 1, wherein the second message comprises a default bearer identifier corresponding to the deleted partial PDN connections,
the triggering the UE to reestablish the deleted partial PDN connections comprises:
when the UE is in an idle state, sending, by the network device, a paging message to trigger the UE to perform a service request procedure to change to a connected state; and
sending, by the network device, a request message to the UE to trigger the UE to initiate a PDN connection establishment procedure to reestablish the deleted partial PDN connections, wherein the request message carries the default bearer identifier.

5. The method according to claim 1, wherein the second message comprises a default bearer identifier corresponding to the partial PDN connections, the triggering the UE to reestablish the deleted partial PDN connections comprises:
when the UE is in an idle state, sending, by the network device, a paging message carrying a UE identifier to the UE to trigger the UE to initiate a service request procedure to synchronize bears with the network device to ascertain the deleted partial PDN connections and then initiate a PDN connection establishment procedure to reestablish the deleted partial PDN connections.

6. The method according to claim 1, wherein the second message comprises a default bearer identifier corresponding to the deleted partial PDN connections,
the triggering the UE to reestablish the deleted partial PDN connections comprises:
when the UE is in a connected state, releasing, by the network device, a connection with the UE to change the UE to an idle state; and
sending, by the network device, a paging message carrying a UE identifier to the UE to trigger the UE to initiate a service request procedure to synchronize bears with the network device to ascertain the deleted partial PDN connections and then initiate a PDN connection establishment procedure to reestablish the deleted partial PDN connections.

7. The method according to claim 6, wherein the releasing the connection with the UE to change the UE to the idle state comprises one of the following:
(a) releasing an S1 connection with the UE, wherein the network device is a mobility management entity (MME); and
(b) releasing an Iu connection with the UE, wherein the network device is a serving general packet radio service support node (SGSN).

8. The method according to claim 1, wherein the network device is a serving general packet radio service support node (SGSN) or a mobility management entity (MME).

9. A network device, comprising:
a transmitter, configured to send a connection deletion request message to a serving gateway (S-GW) when a fault occurs, wherein the connection deletion request message comprises a fully qualified connection set identifier (FQ-CSID), wherein the FQ-CSID indicates a set of packet data network (PDN) connections which is locally deleted by the network device, and the FQ-CSID is used by the S-GW to determine whether all or partial PDN connections of a user equipment (UE) are locally deleted by the network service; and
a receiver, configured to, when it is determined that all PDN connections of the UE are locally deleted by the network device, receive a first message sent by the S-GW to instruct the network device to trigger the UE to initiate an attach procedure, or when it is determined that partial PDN connections of the UE are locally deleted by the network device, receive a second message sent by the S-GW to instruct the network device to trigger the UE to reestablish the deleted partial PDN connections;
wherein the transmitter is further configured to trigger the UE to initiate the attach procedure or trigger the UE to reestablish the deleted partial PDN connections.

10. The network device according to claim 9, wherein the first message comprises a UE identifier,
the transmitter triggering the UE to initiate the attach procedure comprises: sending a paging message carrying the UE identifier to the UE to trigger the UE to initiate the attach procedure.

11. The network device according to claim 9, wherein the second message comprises a default bearer identifier corresponding to the deleted partial PDN connections,
the transmitter triggering the UE to reestablish the deleted partial PDN connections comprises:
when the UE is in a connected state, sending a request message to the UE to trigger the UE to initiate a PDN connection establishment procedure so as to reestablish the deleted partial PDN connections, wherein the request message carries the default bearer identifier.

12. The network device according to claim 9, wherein the second message comprises a default bearer identifier corresponding to the deleted partial PDN connections,
the transmitter triggering the UE to reestablish the deleted partial PDN connections comprises:
when the UE is in an idle state, sending a paging message to trigger the UE to perform a service request procedure to change to a connected state, and
sending a request message to the UE to trigger the UE to initiate a PDN connection establishment procedure to reestablish the deleted partial PDN connections, wherein the request message carries the default bearer identifier.

13. The network device according to claim 9, wherein the second message comprises a default bearer identifier corresponding to the partial PDN connections,
the transmitter triggering the UE to reestablish the deleted partial PDN connections comprises:
when the UE is in an idle state, sending a paging message carrying a UE identifier to the UE to trigger the UE to initiate a service request procedure to synchronize bears with the network device to ascertain the deleted partial PDN connections and then initiating a PDN connection establishment procedure to reestablish the deleted partial PDN connections.

14. The network device according to claim 9, wherein the second message comprises a default bearer identifier corresponding to the deleted partial PDN connections,
the transmitter triggering the UE to reestablish the deleted partial PDN connections comprises:
when the UE is in a connected state, releasing a connection with the UE to change the UE to an idle state, and
sending a paging message carrying a UE identifier to the UE to trigger the UE to initiate a service request procedure to synchronize bears with the network device to ascertain the deleted partial PDN connections and then initiating a PDN connection establishment procedure to reestablish the deleted partial PDN connections.

15. The network device according to claim 14, wherein the transmitter releasing the connection with the UE comprises one of the following:
(a) releasing an S1 connection with the UE, wherein the network device is a mobility management entity (MME); and
(b) releasing an Iu connection with the UE, wherein the network device is a serving general packet radio service support node (SGSN).

16. The network device according to claim 9, wherein the network device is a serving general packet radio service support node (SGSN) or a mobility management entity (MME).

17. A method, comprising:
receiving, by a serving gateway (S-GW), a connection deletion request message sent by a network device when a fault occurs, wherein the connection deletion request message comprises a fully qualified connection set identifier (FQ-CSID), wherein the FQ-CSID indicates a set of packet data network (PDN) connections which is locally deleted by the network device;

determining, by the S-GW, whether all or partial PDN connections of a user equipment (UE) are locally deleted by the network service;

when it is determined that all PDN connections of the UE are locally deleted by the network device, sending, by the S-GW, a first message to the network device to instruct the network device to trigger the UE to initiate an attach procedure; or when it is determined that partial PDN connections of the UE are locally deleted by the network device, sending, by the S-GW, a second message to the network device to instruct the network device to trigger the UE to reestablish the deleted partial PDN connections.

18. The method according to claim 17, wherein the network device is a serving general packet radio service support node (SGSN) or a mobility management entity (MME).

19. A serving gateway (S-GW), comprising a receiver, a processor and a transmitter;

wherein the receiver is configured to receive, a connection deletion request message sent by a network device when a fault occurs, wherein the connection deletion request message comprises a fully qualified connection set identifier (FQ-CSID), wherein the FQ-CSID indicates a set of packet data network (PDN) connections which is locally deleted by the network device;

the processor is configured to determine whether all or partial PDN connections of a user equipment (UE) are locally deleted by the network service;

the transmitter is configured, when it is determined that all PDN connections of the UE are locally deleted by the network device, to send a first message to the network device to instruct the network device to trigger the UE to initiate an attach procedure; or when it is determined that partial PDN connections of the UE are locally deleted by the network device, to send a second message to the network device to instruct the network device to trigger the UE to reestablish the deleted partial PDN connections.

20. The S-GW according to claim 19, wherein the network device is a serving general packet radio service support node (SGSN) or a mobility management entity (MME).

* * * * *